United States Patent [19]
Bandlish et al.

[11] Patent Number: 4,916,199
[45] Date of Patent: Apr. 10, 1990

[54] POLYURETHANES MADE FROM BLENDS OF POLYPROPYLENEOXIDE POLYOL AND ORGANIC-SILICONE BLOCK COPOLYMER BASED POLYOL INTERMEDIATES

[75] Inventors: Baldev K. Bandlish, Charlotte, N.C.; Larry R. Barron, Mentor, Ohio

[73] Assignee: The B. F. Goodrich Company, Akron, Ohio

[21] Appl. No.: 218,780

[22] Filed: Jul. 14, 1988

[51] Int. Cl.⁴ ............................................. C08G 77/04
[52] U.S. Cl. ........................................ 528/28; 528/26; 528/29; 525/453; 525/456; 525/440; 525/460
[58] Field of Search .............................. 528/29, 28, 26; 525/453, 456, 460, 440

[56] References Cited
U.S. PATENT DOCUMENTS 3,629,308 12/1971 Bailey et al. ................... 528/29
3,867,420 2/1975 Morehouse et al. ............ 528/29
4,067,844 1/1978 Barron et al. .................. 525/453
4,507,443 3/1985 Barron et al. .................. 525/453

Primary Examiner—Melvyn I. Marquis
Attorney, Agent, or Firm—James R. Lindsay; Daniel J. Hudak; Nestor W. Shust

[57] ABSTRACT

A urethane sealant or coating composition is made from a physical blend of a polypropyleneoxide polyol intermediate and an organic-silicone block copolymer based polyol intermediate. The urethane prepolymer is made by reacting the physical intermediate blend with a polyisocyanate and preferably blocking the same with blocking agents such as phenols to prevent reaction with moisture in the air. Cure is effected through the utilization of curing agents such as polyamines or polyimines, for example, diamines, amine terminated polyethers, ketimines, aldimines, and the like. The sealant composition can contain various fillers, organosilanes, and the like. The prepolymers of the present invention generally have improved elongation and reduced modulus. Either a one-part or a two-part system can be utilized.

20 Claims, No Drawings

POLYURETHANES MADE FROM BLENDS OF POLYPROPYLENEOXIDE POLYOL AND ORGANIC-SILICONE BLOCK COPOLYMER BASED POLYOL INTERMEDIATES

FIELD OF THE INVENTION

The present invention relates to a sealant or coating composition comprising a blocked isocyanateterminated prepolymer, a polyamine or a polyimine curing agent, and optional organosilanes, fillers, and the like. The prepolymer is made from a physical blend of intermediates containing a minor amount of an organic-silicone block copolymer based polyol.

BACKGROUND

Sealant and coating compositions desirably have a combination of properties which render them particularly suitable for their intended applications. Such compositions should be able to be packaged in sealed containers or cartridges and stored for relatively long periods of time without objectionable "setting up" or hardening, that is curing of the components in the package. The one component sealant composition should form a relatively tack-free surface upon application and upon exposure to atmospheric moisture should cure without the formation of bubbles within a suitable time. The two component system can be formulated into package stable systems with adjustable cure rate and cured sealant properties. When cured, they should adhere tenaciously to a wide variety of surfaces such as glass, aluminum, concrete, marble, and steel. They should also have sufficient elasticity and flexibility to withstand contraction and expansion of panels, and the like, generally associated with temperature variations as a result of climatic changes and/or wind forces.

SUMMARY OF THE INVENTION

According to the concepts of the present invention, urethane sealants and coatings having improved elongation and reduced modulus are produced when a physical blend of polyol intermediates is utilized. The polyol intermediate blend contains a major amount of a polypropyleneoxide polyol having a molecular weight of from about 1,000 to about 10,000 in association with a minor amount of an organic-silicone block copolymer based polyol. The polypropyleneoxide polyol can also be a copolymer. The organic-silicone block copolymer based polyol can be a triblock copolymer having terminal block(s) made from polyalkyleneoxide polyol wherein the alkylene portion contains from 2 to 100 carbon atoms. The silicone block contains a dialiphatic substituted siliconeoxide repeating unit wherein the aliphatic groups independently contain from 1 to 6 carbon atoms. The molecular weight of the organic-silicone block copolymer based polyol is from about 1,000 to about 10,000.

Reaction of the polyol intermediate blend with a polyisocyanate yields a prepolymer which is subsequently blocked with blocking agents such as a phenol. The curing agent can be a polyamine such as a di-or triamine, e.g. an amine terminated polyether, or a fatty acid amine, or polyimines such as ketimines or aldimines. The sealants and coating compositions of the present invention can be either a two-part system or a one-part system which is moisture curable and forms a tack-free surface upon being exposed to the atmosphere for a short period of time. A cured sealant is formed within a matter of hours after application which adheres tenaciously to a wide variety of substrates.

DETAILED DESCRIPTION OF THE INVENTION

The urethane prepolymers of the present invention are generally made from a physical blend of a polypropyleneoxide polyol intermediate and an organic-silicone block copolymer based polyol intermediate. The polypropyleneoxide polyol intermediate can be a homo- or a copolymer having a weight average molecular weight of from about 1,000 to about 10,000 and preferably from about 4,000 to about 7,000. The amount of the polypropyleneoxide polyol intermediate is from about 60 to about 92 percent by weight, and preferably from about 80 to about 90 percent by weight based upon the total weight of the polypropyleneoxide polyol intermediate and the organic-silicone block copolymer based polyol intermediate. The polypropylene oxide polyol may be a copolymer in which the amount of the comonomer is generally from about 0 to about 60 percent and preferably from about 2 to about 6 percent by weight based upon the total weight of the comonomer and the propyleneoxide monomer. Comonomers include butyleneoxide, pentyleneoxide, with ethyleneoxide being preferred. The copolymers can either be random or blocked. The polyol intermediate may or may not be a blend of monols, diols, or triols. Generally, the average functionality of the polypropyleneoxide polyol intermediate is from about 1.9 to about 3.0.

Considering the organic-silicone block copolymer based polyol intermediate, it generally contains two or more organic blocks which are made from an alkyleneoxide monomer having from 2 to 5 carbon atoms with 3 carbon atoms, that is propyleneoxide, being preferred. The two or more organic blocks are terminal blocks and contain hydroxyl end groups. The organic-silicone block copolymer based polyol intermediate can generally be represented by the formula

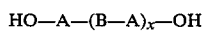

where x is from 1 to 10 with one being preferred, A is the organic block, and B is the silicone block. The organic block, that is A, has been described hereinabove. The silicone (B) block contains repeating units of the formula

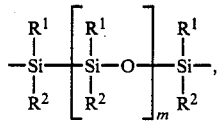

wherein ms is 5 to 100 and preferably 20 to 50, wherein $R^1$ and $R^2$, independently, is an aliphatic, especially an alkyl, having from 1 to 6 carbon atoms with methyl being preferred. The amount of the silicone block is from about 20 to about 80 percent by weight and preferably from about 40 to about 60 percent by weight based upon the total weight of the organic-silicone block copolymer. The amount of the A organic block portion is generally from about 20 to about 80 percent by weight and preferably from about 40 to about 60 percent by weight based upon the total weight of the organic-silicone block copolymer. The organicsilicone block copolymer based polyol generally has a weight average molecular weight of from about 1,000 to about 10,000 with from about 3,000 to about 6,000 being preferred. The amount of the organic-silicone block copolymer based polyol intermediate utilized in forming the intermediate blends of the present invention is from about 8 percent to about 40 percent by weight and preferably from about 10 percent to about 20 percent by weight based upon the total weight of the polypropyleneoxide polyol intermediate and the organic-silicone block copolymer based polyol intermediate.

While the physical polyol intermediate blend of the present invention is generally based upon the two above types of intermediates, it is to be understood that small amounts, that is generally less than 10 percent by weight of one or more additional polyol intermediates, or copolymers thereof, such as other polyether based polyols, polycaprolactone polyols, various polyester polyols, polytetramethylene ether polyols, or other polyols known to the art, can be utilized based upon the total weight of the polypropyleneoxide polyol and the organic-silicone block copolymer based polyol intermediate.

The polyisocyanates which are reacted with the physical blend of the polyol intermediates generally have the formula $R(NCO)_n$ wherein n is 2, 3 or 4 and R is an aliphatic, an aromatic, or an aliphatic substituted aromatic having from 4 to 20 carbon atoms and preferably from 6 to 15 carbon atoms. Desirably the aliphatic groups are alkyl groups. Examples of specific di- or triisocyanates which can be utilized include p,p',p''-triisocyanato triphenyl methane, p,p'-diisocyanato diphenyl methane (MDI), hexamethylene diisocyanate, naphthalene-1,5-diisocyanate, and various isomers of toluene diisocyanates (TDI) such as 2,4-tolylene diisocyanate, 2,6-tolylene diisocyanate, and mixtures thereof. MDI and TDI are preferred. Inasmuch as an adhesive type composition is desired, the equivalent weight ratio of the polyisocyanate to the polyol intermediate, that is the NCO/OH ratio is from about 1.8 to about 2.2 and preferably from about 2.0 to about 2.1. The formation of the prepolymer while occurring at ambient temperature is generally conducted at higher temperatures to reduce the reaction time as from between 40° to about 125° C. with from about 60° to about 100° C. being preferred.

In order to provide a prepolymer that is more stable during storage, the isocyanate-terminated prepolymer described above is substantially "blocked" with a blocking agent that reacts with the terminal isocyanate groups of the prepolymer. Blocking agents useful in the present invention include conventional blocking agents as well as those known to the art and to the literature that produce blocked terminal isocyanates that do not readily react with moisture in air at room temperature (about 25° C.). However, upon exposure of the curing agents to moisture, they will "unblock" the isocyanate and react therewith. General types of blocking agents include the various phenol type compounds, various oxime compounds, various ester compounds, and the like. Examples of suitable blocking agents include phenol, 3-methoxyphenol, 4-methoxyphenol, nonylphenol, meta-cresol, paracresol, 4-chlorophenol, meta-hydroxybenzaldehyde, ortho-hydroxybenzaldehyde, parahydroxybenzaldehyde, hydroquinone, 1-hydroxy-2-propanone, 3-hydroxyacetophenone, 4-hydroxyacetophenone, ethyl acetyl acetate and cyclohexanone oxime. A sufficient amount of the blocking agent is utilized to react with the isocyanate prepolymers to substantially "block" the terminal isocyanate groups and preferably to block all of the terminal isocyanate groups. The amount of blocking agent utilized is such that the equivalent weight ratio of the blocking agent to the terminal isocyanate groups is at least 0.85, generally it is at least 1.00 or more and can be utilized in a large excess since it can be used as a plasticizing agent.

The curing agents of the present invention include the various polyamine and the various polyimine compounds. The particular type of curing agent utilized generally depends upon whether a two-part urethane sealant or coating system is utilized or a one-part system. When a two-part system is utilized, the curing agent is contained as a separate component or composition which is not mixed with the prepolymer component or composition until immediately prior to application of the sealant or coating composition. Generally, any conventional polyamine curing agent can be utilized including those known to the art and to the literature. An example of a typical polyamine curing agent is a diamine or a triamine represented by the formula

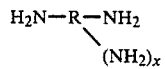

wherein R is an aliphatic, or an aliphatic substituted aromatic, with the aliphatic group being connected to the amine group having from 1 to 25 carbon atoms and preferably from 2 to 10 carbon atoms, with x being 0 or 1, and preferably 0. Examples of specific amine compounds include ethylene diamine, propylene diamine, butylene diamine, octamethylene diamine, decamethylene diamine, and the like.

Another class of suitable polyamine compounds are the various amine terminated polyethers. These compounds are generally diamines or triamines containing polyether groups therein wherein the number of ether repeating units can vary as from about 2 or 3 up to about 150. The molecular weight of the amine terminated polyethers is generally from about 200 to about 7000. Such compounds are produced by the Texaco Chemical Co. under the brand name Jeffamine such as the M series, the D series, the ED series, the DU series, the BuD series, and the Jeffamine T series. Such amine terminated polyethers are described in the bulletin, "The Jeffamine Polyoxyalkyleneamines", by the Texaco Chemical Co., Copyright 1985, NPD-024 102-0745, which is hereby fully incorporated by reference. A particularly preferred compound is the Jeffamine D compounds which have the following formula:

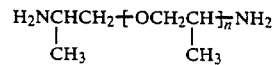

wherein n is from 2 to about 100 and preferably from about 4 to about 20.

Still another class of suitable polyamine compounds are the polyamide polyamines made from polyamines and dicarboxylic acids having from 2 to 36 carbon atoms such as oxalic acid, malonic acid, succinic acid, adipic acid, suberic acid, azelalic acid, dimerized fatty acids, trimerized fatty acids, and the like.

When a one-part system is utilized, that is a composition in which all of the components of the polyurethane sealant or coating are contained together, a polyimine curing agent is generally utilized. The polyimines will not react with the blocked isocyanate-terminated prepolymer unless exposed to moisture as upon application of the sealant. Various polyimines can be prepared by reacting any of the above polyamine compounds with either a ketone or an aldehyde as well known to those skilled in the art and to the literature. The end result is the production of various ketimine compounds or aldimine compounds. Examples of specific ketimine type compounds which can be utilized are set forth in U.S. Pat. No. 4,507,443 which is hereby fully incorporated by reference.

Regardless of whether a one-part or two-part system is utilized, the amount of the polyamine or polyimine curing agent is from about 0.6 to about 1.5 weight equivalents and preferably 0.8 to 1.2 weight equivalents per equivalent of a blocked isocyanate.

When a two-component system is utilized, as noted above, one of the components contains the prepolymer and the second component contains the curing agent. The curing agent component generally contains the polyamine curing agent, and various additives in conventional amounts, if desired, such as various plasticizers, pigments, thickeners, drying agents, and the like. The prepolymer or base component contains various conventional additives or compounding ingredients such as fillers, thixotropic agents, extenders, pigments, plasticizers, UV absorbers, solvents, and the like. Typically, the prepolymer component contains large amounts of a filler such as talc, various types of silicates, various types of clays, calcium carbonate, and the like, in an amount of from about 60 to about 200 parts by weight per 100 parts by weight of the prepolymer; a thickening agent such as a thixotropic compound in an amount of from 0 to about 30 parts by weight per 100 parts by weight of the prepolymer; UV absorbers in an amount of usually less than 1 or 2 parts by weight per 100 parts by weight of the prepolymer; and elasticizers in an amount of from about 0 to about 50 parts by weight per 100 parts by weight of the prepolymer. Solvents, which are generally utilized to adjust the viscosity of the prepolymer or base component to a desired range, constitute generally less than 10 percent volatility of the total prepolymer component for sealant compositions. In coating compositions, the amount of solvent is generally higher.

An optional aspect of the present invention is the utilization of an organosilane or an organosiloxane as an adhesion promoter. The amount of such adhesion promoter is from about 0.1 to about 10 parts by weight per 100 parts by weight of the prepolymer. Types of various adhesion promoters which are desired include an epoxysilane, an isocyanato silane, a ketimino silane, an aminosilane, and the like, such as those set forth in U.S. Patent No. 4,067,844 to Barron, which is hereby fully incorporated by reference.

The prepolymers of the present invention utilizing the above-noted physical blend of a polypropyleneoxide polyol intermediate and an organic-silicone block copolymer based polyol intermediate can be formulated into sealants or coatings with improved properties such as improved elongation, and reduced modulus while maintaining generally good tensile strength.

The invention will be better understood by reference to the following examples.

EXAMPLE 1

A mixture of polypropyleneoxidetriol (R-1322, an experimental product from Union Carbide, molecular weight, 7300) (900 grams), Masil 219-135 (an experimental silicone organic block copolymer based polyol from Mazer Chemicals, Molecular Weight, 4600, molecular weight of combined ether blocks is approximately equal to the molecular weight of silicone block) (100 grams), 76.1 grams of an 80/20 weight percent mixture of 2,4-tolylene diisocyanate and 2,6-tolylene diisocyanate, toluene (100 grams) were heated at 92° C. for three hours. About 100.6 grams of nonyl phenol was then added and heating continued for an additional 45 minutes. About 0.1 grams of stannous octoate was then added and heating continued for another two hours to give a polymer used in Examples A and C.

EXAMPLE 2 (Control)

A polyurethane prepolymer used in Examples B and D were prepared using 1001 grams of R-1322 (see Example 1), 75.2 grams of an 80/20 weight percent mixture of 2,4-tolylene diisocyanate, and 2,6-tolylene diisocyanates, 100 grams of toluene, 99.6 grams of nonyl phenol, and 0.2 grams of stannous octoate. Procedure for preparing this prepolymer is given in Example 1.

EXAMPLE 3

A mixture of polypropyleneoxidetriol (molecular weight, about 6000, 300 grams), Masil 219-135 (100 grams), 35.2 grams of an 80/20 weight percent mixture of 2,4-tolylene diisocyanate and 2,6-tolylene diisocyanate, toluene (40 grams) were heated at 95° C. for two hours. About 44.5 grams of nonyl phenol was then added and heating continued for an additional one hour. About 0.04 grams of stannous octoate was then added and heating continued for another two hours to give a polymer used in Example E.

EXAMPLE 4

A mixture of Masil 219-135 (1000 grams), 82.0 grams of an 80/20 weight percent mixture of 2,4-tolylene diisocyanate and 2,6-tolylene diisocyanate, toluene (70 grams) were heated at 8020 C. for two hours. About 99.9 grams of nonyl phenol was then added and heating continued for an additional one hour. About 0.1 grams of stannous octoate was then added and heating continued for another two hours to give a polymer used in Example F.

TABLE I

|  | Example A | Example B | Example C | Example D | Example E | Example F |
| --- | --- | --- | --- | --- | --- | --- |
| Polymer Type | Example 1 | Example 2 | Example 1 | Example 2 | Example 3 | Example 4 |
| Curative | * | * | * | * | Jeffamine D-400 | Jeffamine T-403 |
| % Curative | 80 | 80 | 95 | 95 | 93 | 85 |
| Elongation | 1550 | 1380 | 957 | 736 | 1001 | Poor Cure |
| 100% Modulus | 32 | 40.5 | 56.5 | 62.9 | 34 | Properties not measureable |
| Tensile Strength | 209[1] | 250[1] | 391 | 328 | 152 |  |
| Cure Cycle | 1 Week at room temperature, 1 week at 120° F. | | | | 1 day/158° F. | 80 hrs. |

TABLE I-continued

|  | Example A | Example B | Example C | Example D | Example E | Example F |
|---|---|---|---|---|---|---|
|  |  |  |  |  | 3 hours/180° F. | at 158° F. |
| % Organic Silicone | 10 | 0 | 10 | 0 | 25 | 100 |

[1] This sample was cured an additional four days at room temperature
*Ketimine prepared from methylisobutyl ketone and Jeffamine D-400

As apparent from Table I, by comparing Example A to B and by comparing Example C to D, utilization of 10 percent by weight of an organic-silicone block copolymer based polyol intermediate of the present invention resulted in improved elongation and reduced 100 percent modulus at different cure levels. The tensile strength in Examples A and C were very adequate.

Example E utilizing 25 percent of the organicsilicone block copolymer based polyol intermediate gave adequate elongation and reduced 100 percent modulus as well as adequate tensile strength. However, when the amount of the organic-silicone block copolymer based polyol intermediate was increased to 100 percent as in Example F, poor properties were obtained.

While in accordance with the Patent Statutes, the best mode and preferred embodiment has been set forth, the scope of the invention is not limited thereto, but rather by the scope of the attached claims.

What is claimed is:

1. A prepolymer composition, comprising:
an isocyanate-terminated urethane prepolymer having substantially all of said isocyanate groups blocked with an isocyanate reactive blocking agent, said urethane prepolymer being a blend of a polypropyleneoxide polyol intermediate and an organic-silicone block copolymer based polyol intermediate reacted with a polyisocyanate, the amount of said polypropyleneoxide polyol intermediate being from about 60 percent to about 92 percent by weight based upon the total weight of said polypropyleneoxide polyol intermediate and said organicsilicone block copolymer based polyol intermediate, the amount of said organic-silicone block copolymer based polyol intermediate being from about 8 percent to about 40 percent by weight based upon the total weight of said polypropyleneoxide polyol intermediate and said organic-silicone block copolymer based polyol intermediate, said polypropyleneoxide polyol having a molecular weight of from about 1,000 to about 10,000, and said organicsilicone block copolymer based polyol intermediate having a molecular weight of from about 1,000 to about 10,000.

2. A prepolymer composition according to claim 1, wherein said polypropyleneoxide polyol intermediate is a homopolymer or a copolymer, wherein said copolymer is made from the reaction of a propyleneoxide monomer and an ethyleneoxide, butyleneoxide, or pentyleneoxide comonomer, wherein the amount of said comonomer is up to about 60 percent by weight based upon the total weight of said propyleneoxide monomer and said comonomer, wherein said organic-silicone block copolymer based polyol intermediate has two or more organic blocks therein and at least one silicone block, wherein said organic block is made from an alkyleneoxide monomer having from 2 to 5 carbon atoms, wherein said silicone block contains repeating units of the formula

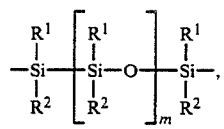

wherein $R^1$ and $R^2$, independently, is an aliphatic having from 1 to 6 carbon atoms, wherein the amount of said two or more organic blocks is from about 20 percent to about 80 percent by weight and wherein said silicone block is from about 20 percent to about 80 percent by weight based upon the total weight of said organic-silicone block copolymer based polyol intermediate.

3. A prepolymer composition according to claim 2, wherein $R^1$ and $R^2$, independently, is an alkyl having from 1 to 6 carbon atoms, and wherein the equivalent ratio of said blocking agent to said terminated isocyanate groups is at least 0.85.

4. A prepolymer composition according to claim 3, wherein said organic-silicone block copolymer based polyol intermediate has two organic blocks, wherein said organic block is a polypropyleneoxide polymer, wherein said polyisocyanate has the formula $R(NCO)_n$ where R is an aliphatic, an aromatic, or an aliphatic substituted aromatic having from 4 to 20 carbon atoms, wherein n is 2, 3, or 4, and wherein the equivalent weight ratio of said polyisocyanate to said polyol blend of said polypropyleneoxide polyol intermediate and said organic-silicone block copolymer based polyol intermediate is from about 1.8 to about 2.2.

5. A prepolymer composition according to claim 4, wherein the molecular weight of said polypropyleneoxide polyol is from about 4,000 to about 7,000, wherein the molecular weight of said organic-silicone block copolymer based polyol intermediate is from about 3,000 to about 6,000, wherein the equivalent weight ratio of said blocking agent to said terminated isocyanate groups is at least 1.0, and wherein the amount of said two organic blocks is from about 40 percent to about 60 percent by weight and wherein the amount of said silicone-block is from about 40 percent to about 60 percent by weight based upon the total weight of said organic-silicone block copolymer based polyol intermediate.

6. A prepolymer composition according to claim 5, wherein the amount of said polypropyleneoxide polyol intermediate is from about 80 percent to about 90 percent be weight and wherein the amount of said organic-silicone block copolymer based polyol intermediate is from about 10 percent to about 20 percent by weight based upon the total weight of said polypropyleneoxice polyol intermediate and said organic-silicone block copolymer based polyol intermediate, wherein said comonomer is ethyleneoxide, wherein the amount of said ethyleneoxide comonomer is from about 2 percent to about 6 percent by weight based upon the total weight of said propyleneoxide monomer and said ethyleneoxide comonomer, wherein $R^1$ and $R^2$ is methyl, and wherein said polyisocyanate is MDI or TDI.

7. A prepolymer composition according to claim 2, wherein said prepolymer is cured upon exposure to moisture.

8. A prepolymer composition according to claim 4, wherein said prepolymer is cured upon exposure to moisture.

9. A prepolymer composition according to claim 6, wherein said prepolymer is cured upon exposure to moisture.

10. A polyurethane sealant composition or admixture, comprising:
an isocyanate-terminated and blocked prepolymer and an effective amount of a polyamine or a polyimine curing agent capable of curing said blocked urethane prepolymer, said urethane prepolymer being a blend of a polypropyleneoxide polyol intermediate and an organic-silicone block copolymer based polyol intermediate reacted with a polyisocyanate, the amount of said polypropyleneoxide polyol intermediate being from about 60 percent to about 92 percent by weight based upon the total weight of said polypropyleneoxide polyol intermediate and said organicsilicone block copolymer based polyol intermediate, the amount of said organic-silicone block copolymer based polyol intermediate being from about 8 percent to about 40 percent by weight based upon the total weight of said polypropyleneoxide polyol intermediate and said organic-silicone block copolymer based polyol intermediate, said polypropyleneoxide polyol having a molecular weight of from about 1,000 to about 10,000 and said organicsilicone block copolymer having a molecular weight of from about 1,000 to about 10,000.

11. A polyurethane sealant composition or admixture according to claim 10, wherein said polypropyleneoxide polyol intermediate is a homopolymer or a copolymer, wherein said copolymer is made from the reaction of a propyleneoxide monomer and an ethyleneoxide, butyleneoxide, or pentaleneoxide comonomer, wherein the amount of said comonomer is up to about 60 percent by weight based upon the total weight of said propyleneoxide monomer and said comonomer.

12. A polyurethane sealant composition or admixture according to claim 11, wherein said organic-silicone block copolymer based polyol intermediate has the formula

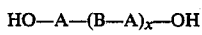

wherein x is 1 to 10, wherein A is an organic block portion, and wherein B is an silicone block portion.

13. A polyurethane sealant composition or admixture according to claim 12, wherein said "A" organic block is made from a polyalkyleneoxie monomer having from 2 to 5 carbon atoms, wherein said "B" silicone block contains repeating units of the formula

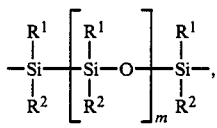

wherein "m" is from 5 to 100, wherein $R^1$ and $R^2$, independently, is an aliphatic having from 1 to 6 carbon atoms, wherein the amount of said two or more organic blocks is from about 20 percent to about 80 percent by weight and wherein said silicone block is from about 20 percent to about 80 percent by weight based upon the total weight of said organic-silicone block copolymer based polyol intermediate.

14. A polyurethane sealant composition or admixture according to claim 13, wherein $R^1$ and $R^2$, independently, is an alkyl having from 1 to 6 carbon atoms, wherein said blocked prepolymer is blocked with a blocking agent, wherein the equivalent ratio of said blocking agent to said terminated isocyanate groups is at least 0.85, wherein said organic-silicone block copolymer based polyol intermediate has two organic blocks, wherein said organic block is a propyleneoxide polymer, wherein said a polyisocyanate has the formula $R(NCO)_n$ where R is an aliphatic, an aromatic, or an aliphatic substituted aromatic having from 4 to 20 carbon atoms, wherein n is 2, 3, or 4, and wherein the equivalent weight ratio of said polyisocyanate to said polyol blend of said polypropyleneoxice polyol intermediate of said organic-silicone block copolymer based polyol intermediate is from about 1.8 to about 2.2.

15. A polyurethane sealant composition or admixture according to claim 14, wherein the molecular weight of said polypropyleneoxide polyol is from about 4,000 to about 7,000, wherein the molecular weight of said organicsilicone block copolymer is from about 3,000 to about 6,000, wherein the equivalent weight ratio of said blocking agent to said terminated isocyanate groups is at least 1.0, and wherein the amount of said two organic blocks is from about 40 percent to about 60 percent by weight and wherein the amount of said silicone block is from about 40 percent to about 60 percent by weight based upon the total weight of said organic-silicone block copolymer based polyol intermediate.

16. A polyurethane sealant composition admixture according to claim 15, wherein said "x" is 1, wherein the amount of said polypropyleneoxide polyol intermediate is from about 80 percent to about 90 percent by weight and wherein the amount of said organic-silicone block copolymer based polyol intermediate is from about 10 percent to about 20 percent by weight based upon the total weight of said polypropyleneoxide polyol intermediate and said organic-silicone block copolymer based polyol intermediate, wherein said comonomer is ethyleneoxide, wherein the amount of said ethyleneoxide comonomer is from about 2 percent to about 6 percent by weight based upon the total weight of said propyleneoxide monomer and said ethyleneoxide comonomer, wherein $R^1$ and $R^2$ is methyl, wherein "m" is 20 to 50, wherein said polyisocyanate is MDI or TDI.

17. A polyurethane sealant composition or admixture according to claim 11, wherein said composition or admixture is moisture cured.

18. A polyurethane sealant composition or admixture according to claim 15, wherein said composition or admixture is moisture cured.

19. A polyurethane sealant composition or admixture according to claim 12, wherein said composition or admixture is a one-part system, and wherein said one-part system is moisture cured.

20. A polyurethane sealant composition or admixture according to claim 16, wherein said composition or admixture is a one-part system, and wherein said one-part system is moisture cured.

* * * * *